United States Patent
Hosaka et al.

(10) Patent No.: US 7,480,982 B2
(45) Date of Patent: Jan. 27, 2009

(54) SOAKED DE-SWAGE METHOD FOR REBUILDING HEAD STACK ASSEMBLY

(75) Inventors: Junichi Hosaka, Kanagawa (JP); Yasuhiro Mita, Kanagawa (JP); Katsuo Tsubaki, Kanagawa (JP)

(73) Assignee: Hitachi GLobal Storage Technologies Netherlands B.V., Amsterdam (NL)

( * ) Notice: Subject to any disclaimer, the term of this patent is extended or adjusted under 35 U.S.C. 154(b) by 407 days.

(21) Appl. No.: 11/254,111

(22) Filed: Oct. 18, 2005

(65) Prior Publication Data
US 2006/0085970 A1 Apr. 27, 2006

(30) Foreign Application Priority Data
Oct. 21, 2004 (JP) .............. 2004-306820

(51) Int. Cl.
G11B 5/127 (2006.01)
H04R 31/00 (2006.01)

(52) U.S. Cl. .............. 29/603.06; 29/603.03; 29/603.04; 360/244.2; 360/244.8; 360/266.1; 360/266.4; 360/265.7

(58) Field of Classification Search .............. 29/603.03, 29/603.04, 603.06; 360/244.2, 244.8, 264.7–264.9, 360/266.1, 266.4, 265.7, 294.4–294.7
See application file for complete search history.

(56) References Cited

U.S. PATENT DOCUMENTS 5,512,725 A * 4/1996 Kelemen et al. ........ 219/121.64
6,560,852 B2 * 5/2003 Liem et al. ............... 29/603.03

* cited by examiner

Primary Examiner—Paul D Kim
(74) Attorney, Agent, or Firm—Townsend and Townsend and Crew LLP; John Henkhaus

(57) ABSTRACT

Embodiments of the invention relate to techniques to remove a defective head gimbal assembly (HGA) from a head stack assembly and replace the defective HGA with a good one without allowing any good HGAs to be damaged. In one embodiment, a volatile alcohol solvent is moved by gravity from a holder included in a reworking tool provided for a reworking jig to a shearing edge of a cartridge type edge mounted in the holder. The alcohol solvent is thereby deposited on the shearing edge in a drop-like shape through surface tension. The cartridge type edge is made to slide on a surface of an actuator arm and is inserted in a gap between contacting surfaces of a mount plate and the actuator arm. This assigns the drop-like alcohol solvent a function as a lubricant. Possible vibration can therefore be prevented from being transmitted through a carriage to other HGAs.

13 Claims, 12 Drawing Sheets

Fig. 9
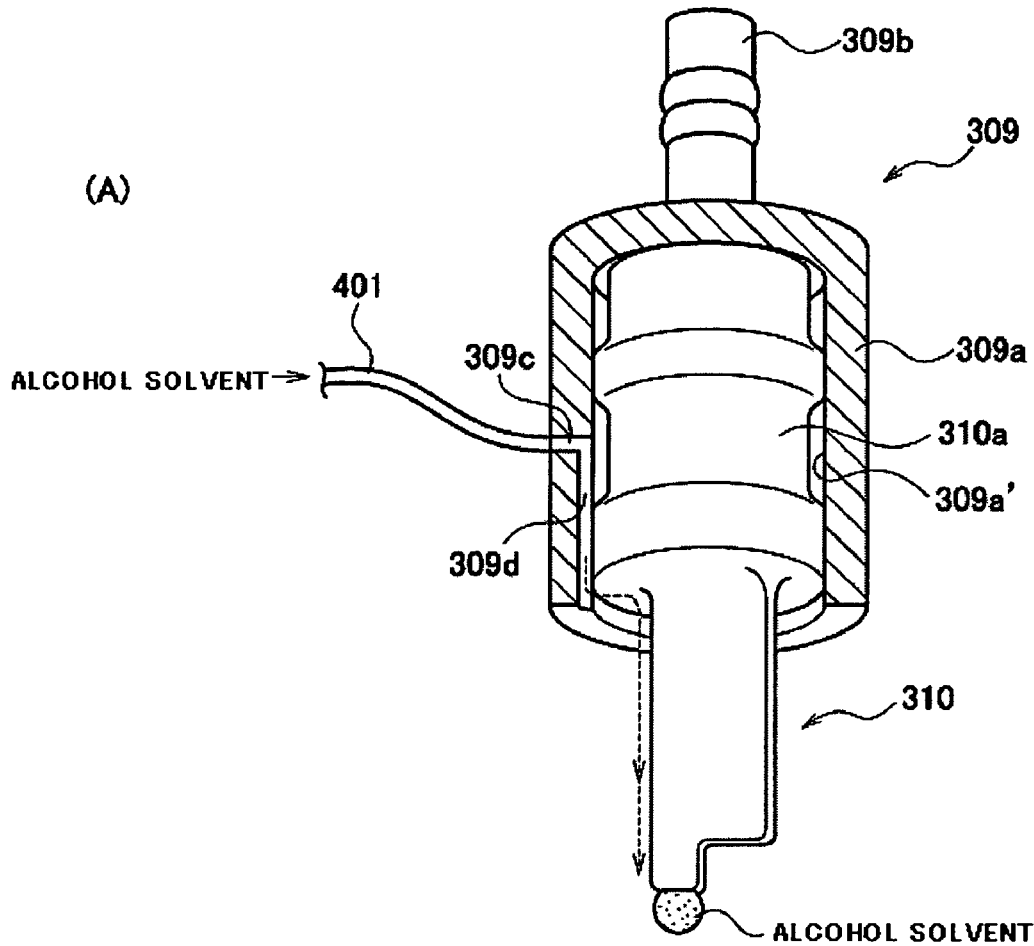
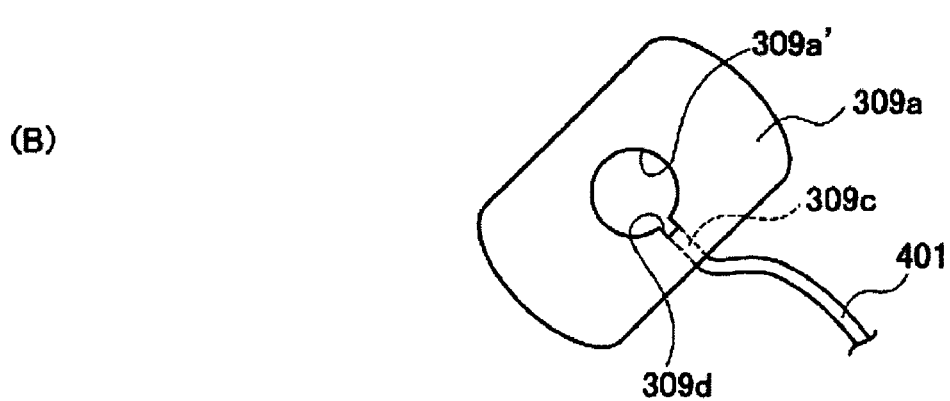

Fig. 1 0

|  | A-7 | A-11 | AP-1 | AP-7 | H-11 | HP-1 | HP-7 |
|---|---|---|---|---|---|---|---|
| ETHANOL | 85.5±1.0 | 85.5±1.0 | 85.5±1.0 | 85.5±1.0 | 79.3±1.0 | 79.3±1.0 | 79.3±1.0 |
| METHANOL | LESS THAN 5.0 | 13.4±0.5 | 1.1±0.2 |  | 13.3±0.5 | 1.1±0.2 |  |
| I. P. A |  | 1.1±0.2 | 13.4±0.5 |  | 1.1±0.2 | 13.3±0.5 | LESS THAN 5.0 |
| N. P. A | 9.6±0.5 |  |  | 9.6±0.5 |  |  | 9.5±0.5 |
| WATER CONTENT | 0.2 MAX | 0.2 MAX | 0.2 MAX | 0.2 MAX | 6.3 MAX | 6.3 MAX | 6.3 MAX |

Fig. 11
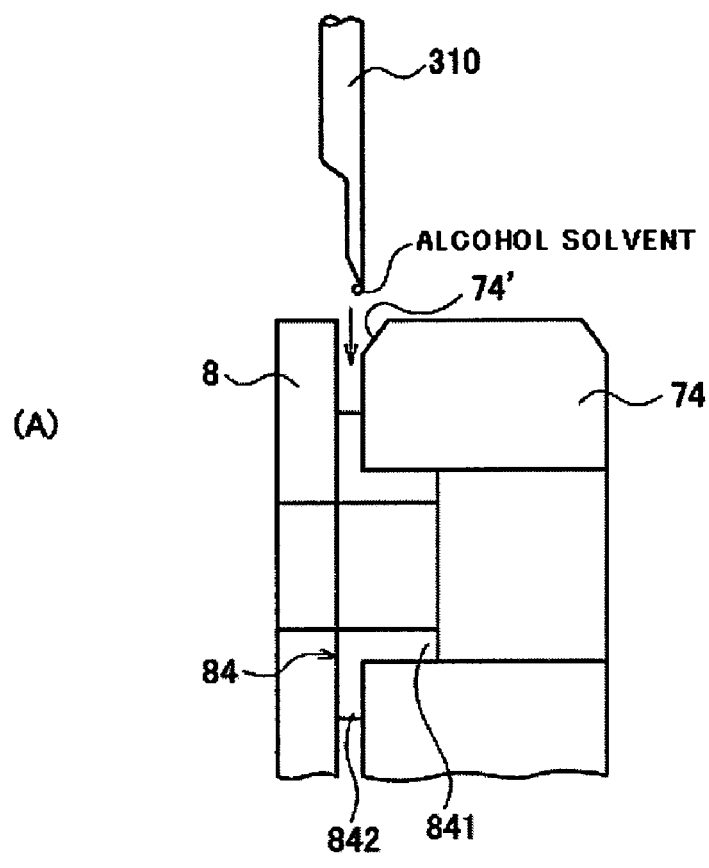
(A)
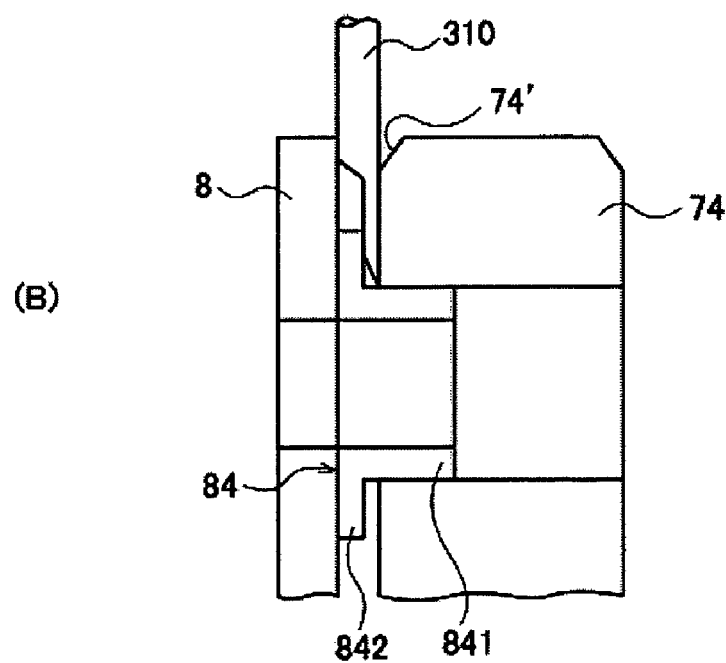
(B)

Fig. 1 2 (PRIOR ART)
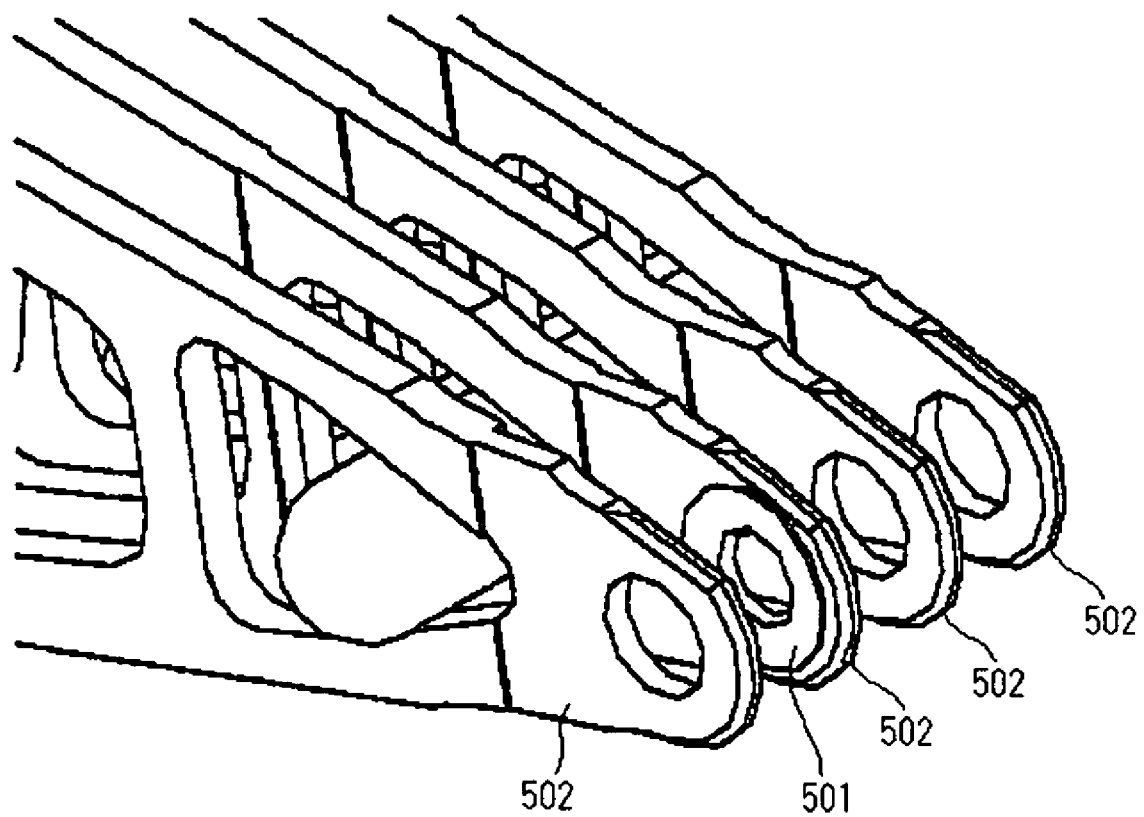

SOAKED DE-SWAGE METHOD FOR REBUILDING HEAD STACK ASSEMBLY

CROSS-REFERENCES TO RELATED APPLICATIONS

This application claims priority from Japanese Patent Application No. JP2004-306820, filed Oct. 21, 2004, the entire disclosure of which is incorporated herein by reference.

BACKGROUND OF THE INVENTION

The present invention relates generally to a technique for rebuilding a head stack assembly used in a magnetic disk drive. More particularly, the present invention relates to a technique for removing a defective head gimbal assembly from the head stack assembly and replacing the defective head gimbal assembly with a good one without allowing any good head gimbal assemblies to be damaged.

A magnetic disk drive uses a head gimbal assembly (hereinafter abbreviated to an "HGA") and a carriage. The HGA includes a magnetic head/slider and a suspension. The carriage includes an actuator arm and a voice coil. The suspension assembly of the HGA includes a flexure allowing the head/slider to make a flexible pivot motion, or what is also called as a gimbal motion. The suspension assembly further includes a load beam for supporting the flexure and a hinge for giving a pressing load to the load beam.

A mount plate is secured to the HGA. The HGA is secured to the actuator arm of the carriage through swaging of the mount plate. An assembly including the carriage and the HGA is called a head stack assembly (hereinafter abbreviated to an "HSA"). A number of HGAs corresponding to the number of recording surfaces of a magnetic disk are incorporated into the HSA. A defect may at times be detected in a specific HGA when a variety of functional tests are carried out after the magnetic disk drive has been assembled. This makes it necessary to replace the defective HGA with a good HGA, thereby rebuilding the HSA.

BRIEF SUMMARY OF THE INVENTION

The HSA is mounted with a plurality of HGAs stacked one on top of another at narrow intervals. When a defective HGA is to be removed, it is important not to allow any good HGAs to be damaged or stressed. In particular, the flexure is formed by a flexible, thin metallic material. Degraded performance could therefore result with the flexure because of vibrations and contacts with reworking tools that the flexure can undergo during removal procedures. On the other hand, the HGA is secured in position through a swaging operation performed on the actuator arm into a swaging hole. When the HGA is to be removed from the actuator arm, a shearing edge of the reworking tool is inserted into a gap formed by contacting surfaces between the mount plate and the actuator arm. A mechanical wedging force is thus applied. At one time, vibration could be transmitted during this procedure to other HGAs by way of the carriage and some good HGAs may be damaged. At other times, it may happen that the shearing edge of the reworking tool cannot be inserted into the gap between the mount plate and the actuator arm and the shearing edge contacts the load beam. A mount plate 501 may then be left attached to an actuator arm 502 as shown in FIG. 12. It therefore may take extra time to remove the mount plate 501.

It is therefore a feature of the present invention to provide a method for rebuilding the HSA by removing a defective HGA and replacing the defective HGA with a good HGA without allowing any good HGA to be damaged. It is another feature of the present invention to provide a method for manufacturing the HSA by replacing a defective HGA with a good HGA. It is still another feature of the present invention to provide a magnetic disk drive including such an HSA as cited above.

The present invention is characterized in the following point as observed during a procedure for removing a defective HGA from the HSA by inserting the shearing edge of the reworking tool into a gap formed by contacting surfaces between the mount plate and the actuator arm. Specifically, the present invention allows the defective HGA to be removed without leaving the mount plate on the actuator arm, while ensuring that any good HGAs will not be damaged or stressed by depositing a volatile alcohol solvent to the shearing edge of the reworking tool. The volatile alcohol solvent is assigned with the function as a lubricant only when the shearing edge of the reworking tool is inserted between the contacting surfaces. If the removal procedure is performed in a clean room, therefore, other apparatuses placed in the clean room can be prevented from being adversely affected. If one of common lubricants containing oil is used instead of the volatile alcohol solvent, the lubricant disperses gas. This necessitates implementation of means for local ventilation or other measures. The volatile alcohol solvent requires no such measures, since the solvent vaporizes quickly within several seconds.

In a first aspect of the present invention, a method is concerned with rebuilding an HSA. The HSA includes a carriage having an actuator arm and a plurality of HGAs. A base plate of a mount plate is fixed to each of the plurality of HGAs. A boss of each mount plate is swaged into the actuator arm. The method for rebuilding the HSA includes the following steps: specifically, mounting the HSA in a jig; facing a shearing edge of a reworking tool to contacting surfaces of the base plate and the actuator arm; depositing a volatile alcohol solvent on the shearing edge of the reworking tool; letting the shearing edge of the reworking tool slide on a surface of the actuator arm to insert the shearing edge of the reworking tool in the contacting surfaces of the base plate and the actuator arm and thereby removing the mount plate together with the HGA from the actuator arm; and securing another HGA to the actuator arm, from which the first HGA has been removed, through a swaging operation.

In a second aspect of the present invention, a method is concerned with manufacturing an HSA used in a magnetic disk drive. The method for manufacturing the HSA includes the following steps: specifically, assembling an HSA including a carriage and a plurality of HGAs, each HGA being fixed to an actuator arm of the carriage through swaging; inspecting the HSA to identify a defective HGA; removing the defective HGA from the HSA; and fixing another HGA to the actuator arm, from which the defective HGA has been removed, through a swaging operation. The step for removing the defective HGA from the HSA includes the following substeps: specifically, mounting the HSA in a jig; facing a shearing edge of a reworking tool to contacting surfaces of the base plate of a mount plate and the actuator arm; depositing a volatile alcohol solvent on the shearing edge of the reworking tool; letting the shearing edge of the reworking tool slide on a surface of the actuator arm to insert the shearing edge of the reworking tool in the contacting surfaces of the base plate and the actuator arm and thereby removing the mount plate together with the HGA from the actuator arm.

In a third aspect of the present invention, a magnetic disk drive including a head stack assembly manufactured through the manufacturing method according to the second aspect of the present invention is provided. The magnetic disk drive includes a base, a magnetic disk rotatably mounted on the base, and the head stack assembly. The head stack assembly includes a head gimbal assembly including a magnetic head for reading data from the magnetic disk and a suspension, and a carriage to which the head gimbal assembly is mounted.

According to the present invention, friction between the shearing edge of the reworking tool and the surface of the actuator arm can be lessened so that the shearing edge of the reworking tool can be smoothly moved onto the contacting surfaces between the base plate of the mount plate and the actuator arm. A method can therefore be provided, whereby a defective HGA is removed from the HSA and is then replaced with a good HGA without allowing any good HGAs to be damaged, thereby rebuilding the HSA. According to the present invention, a method for manufacturing an HSA by replacing a defective HGA with a good HGA can be provided. Further, a magnetic disk drive including an HSA manufactured by replacing a defective HGA with a good HGA without allowing any good HGAs to be damaged or stressed can be provided.

BRIEF DESCRIPTION OF THE DRAWINGS

FIGS. 9A and 9B are partly detailed views illustrating a reworking tool of the reworking jig.

FIG. 10 is a chart showing a composition of SOLMIX.

FIGS. 11A and 11B are views illustrating a condition, in which a defective HGA is removed using the reworking jig.

FIG. 12 is a view illustrating a faulty condition resulting from removal of a defective HGA using the conventional working procedure.

DETAILED DESCRIPTION OF THE INVENTION

Figure 1:
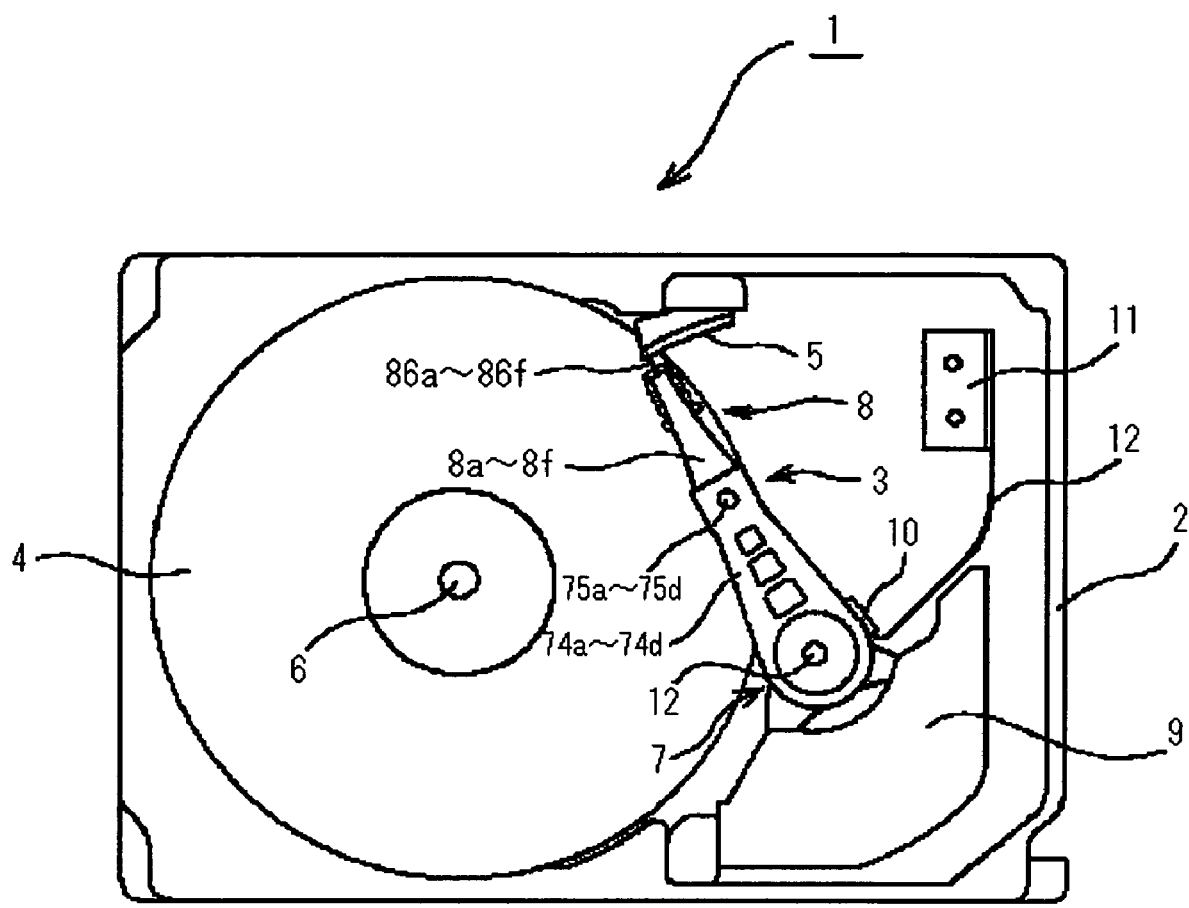
FIG. 1 is a plan view showing a structure of a magnetic disk drive using an HSA.
Figure 2:
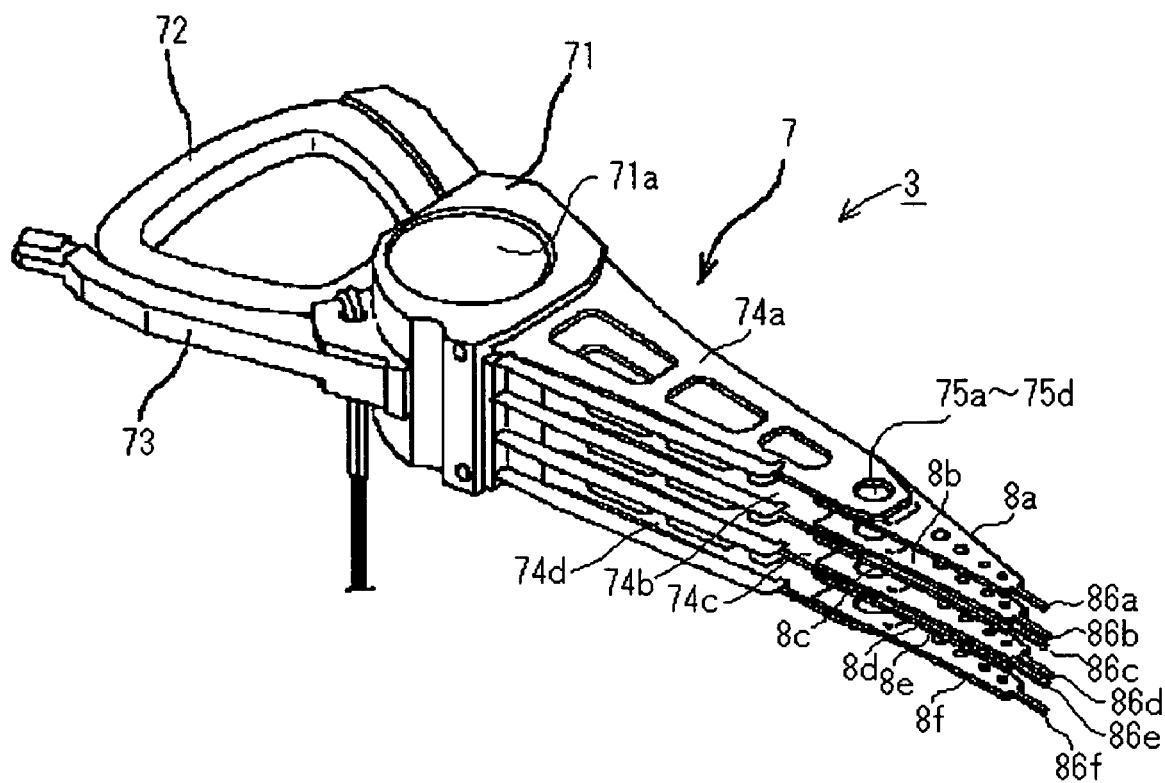
FIG. 2 is a view illustrating a structure of the HSA.

Specific embodiments of the present invention will be described with reference to the accompanying drawings. Throughout this entire specification, similar reference numerals are used to denote similar parts. FIG. 1 is a plan view showing schematically a structure of a magnetic disk drive 1 using an HSA manufactured through manufacturing processes according to one embodiment of the present invention. FIG. 2 is a perspective view showing the HSA shown in FIG. 1. The magnetic disk drive 1 has a clean air, totally closed space formed by a base 2 and a top cover (not shown) covering an upper portion of the base 2. An HSA 3, a magnetic disk stack 4, a ramp 5, and the like are accommodated in the magnetic disk drive 1.

The magnetic disk stack 4 includes one or more disks stacked one on top of another and mounted to a spindle hub (not shown) so that the disks can spin around a spindle shaft 6 supported on a bottom surface of the base 2. A recording surface is formed on a front side and a backside of each of these disks. There are three magnetic disks stacked according to a specific embodiment of the present invention.

The HSA 3 includes a carriage 7 and HGAs 8a to 8f. FIG. 2 shows the carriage 7 including a pivot bearing 71, a coil support 73 for supporting a voice coil 72, and actuator arms 74a to 74d. The carriage 7 can be formed by drawing aluminum and then forming the drawn aluminum into a desired shape. The carriage 7 may also be one-piece molded through aluminum diecasting. A voice coil yoke 9 (see FIG. 1) forming a voice coil motor with the voice coil 72 is disposed in rear of the pivot bearing 71. A permanent magnet is attached to an inner side of the voice coil yoke 9, thus forming a static magnetic field.

A recording area is provided for each of the front side and the backside of the magnetic disk stack 4 including the three magnetic disks stacked one on top of another. The four actuator arms 74a to 74d formed in the carriage 7 are stacked such that each corresponds to the recording area. The actuator arm 74a is mounted with the HGA 8a. The actuator arm 74d is mounted with the HGA 8f. The actuator arm 74b is mounted with the HGAs 8b and 8c. The actuator arm 74c is mounted with the HGAs 8d and 8e. The HGA 8a is connected to the actuator arm 74a with a boss 841 of a mount plate 84a (see FIG. 3) that is swaged into a swaging hole 75a formed on a leading end of the actuator arm 74a. The HGA 8f is connected to the actuator arm 74d with the boss 841 of a mount plate 84f (see FIG. 3) that is swaged into a swaging hole 75d formed on a leading end of the actuator arm 74d. The HGA 8b is connected to the actuator arm 74b with the boss 841 of a mount plate 84b (see FIG. 3) that is swaged from above into a swaging hole 75b formed on a leading end of the actuator arm 74b. The HGA 8c is connected to the actuator arm 74b with the boss 841 of a mount plate 84c (see FIG. 3) that is swaged from below into the swaging hole 75b formed on the leading end of the actuator arm 74b. Further, the HGA 8d is connected to the actuator arm 74c with the boss 841 of a mount plate 84d (see FIG. 3) that is swaged from above into a swaging hole 75c formed on a leading end of the actuator arm 74c. The HGA 8e is connected to the actuator arm 74c with the boss 841 of a mount plate 84e (see FIG. 3) that is swaged from below into the swaging hole 75c formed on the leading end of the actuator arm 74c.

The HGAs 8a to 8f include the following parts. The parts are, specifically: a magnetic head for reading and writing data from/to the disk, or for performing either of these operations; a slider to which the magnetic head is mounted; a flexure for flexibly supporting the slider to allow for pivot motion; and load beams 81a to 81f and 82a to 82f (see FIG. 3) for supporting the flexure to apply a pressure to the slider so as to move toward the disk surface.

Figure 3:
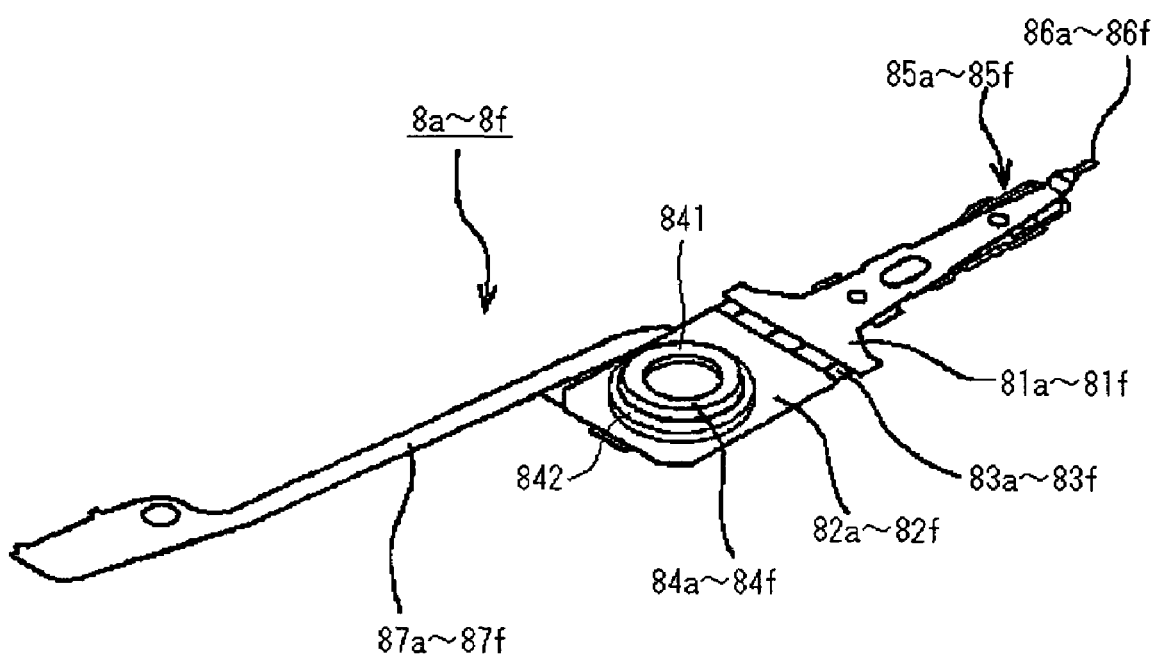
FIG. 3 is a view illustrating a structure of an HGA.

FIG. 3 is a view showing a structure of the HGAs 8a to 8f. Each of the HGAs 8a to 8f includes corresponding ones of the following parts. The parts are specifically: load beams 81a to 81f and 82a to 82f; hinges 83a to 83f; mount plates 84a to 84f; and flexure assemblies 85a to 85f spot-welded to an underside of the load beam 81a to 81f. Each of the mount plates 84a to 84f includes corresponding ones of the boss 841 and a base plate 842. The boss 841 is fitted into a corresponding one of swaging holes 75a to 75d in the actuator arms 74a to 74d and then swaged. The base plate 842 is secured by being pinched between a corresponding one of the actuator arms 74a to 74d and a corresponding one of the HGAs 8a to 8f.

The HSA 3 includes a relay terminal 10. The relay terminal 10 connects a wire trace 87 connected to the magnetic head with a flexible printed wiring board 12 connected to an external terminal 11. The external terminal 11 is connected to a wiring board (not shown) disposed on a backside of the base 2 and provided for controlling operations of the magnetic disk drive 1 and data communications with an external device. The HSA 3 as configured as described above revolves about a pivot shaft 12 to move the magnetic head/slider to a point above the magnetic disk. Before the magnetic disk is brought to a stop, the HSA 3 engages a merge lip with the ramp, thereby retracting the magnetic head/slider.

Figure 4:
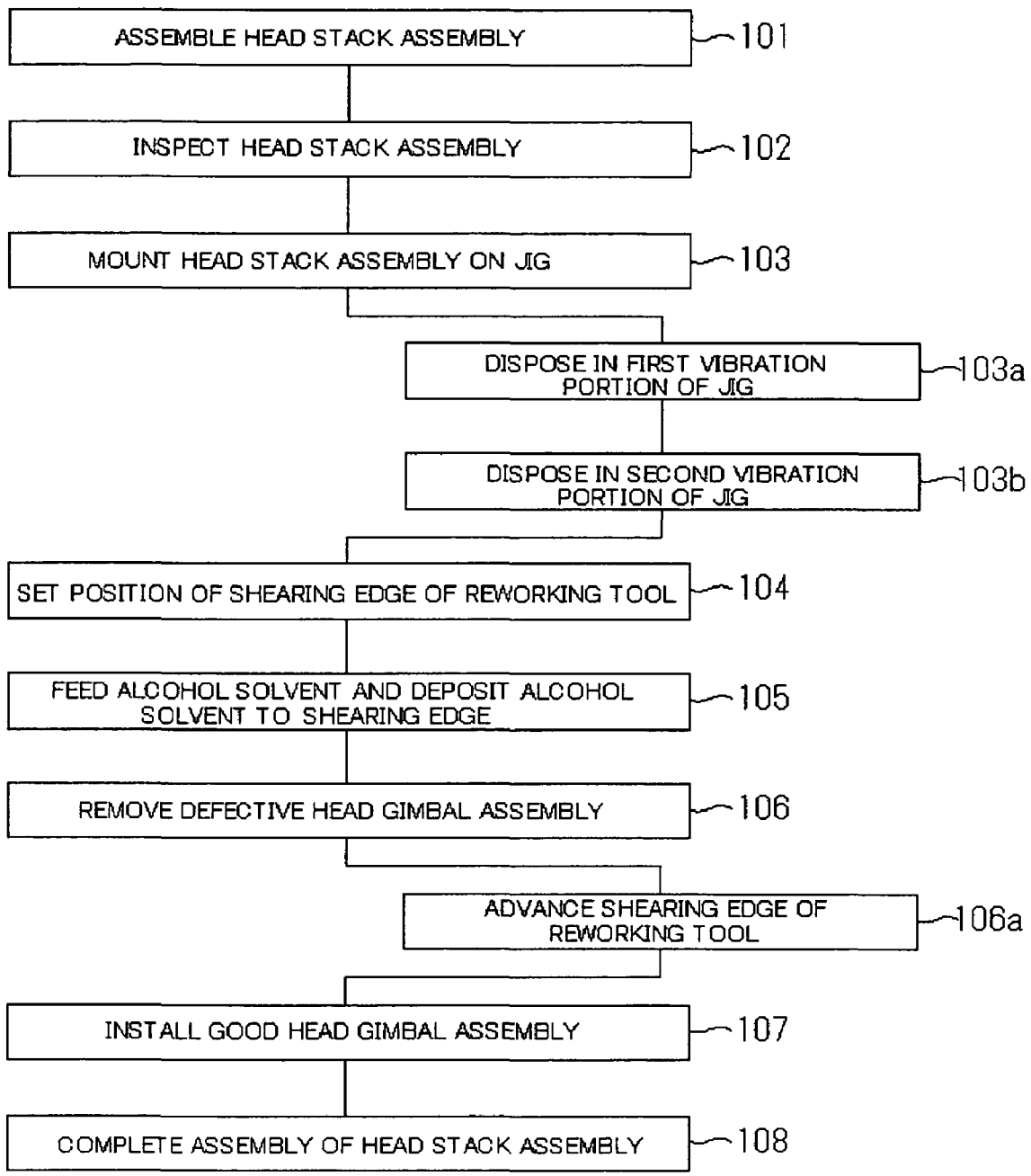
FIG. 4 is a flowchart illustrating manufacturing processes of the HSA according to an embodiment of the present invention.
Figure 5:
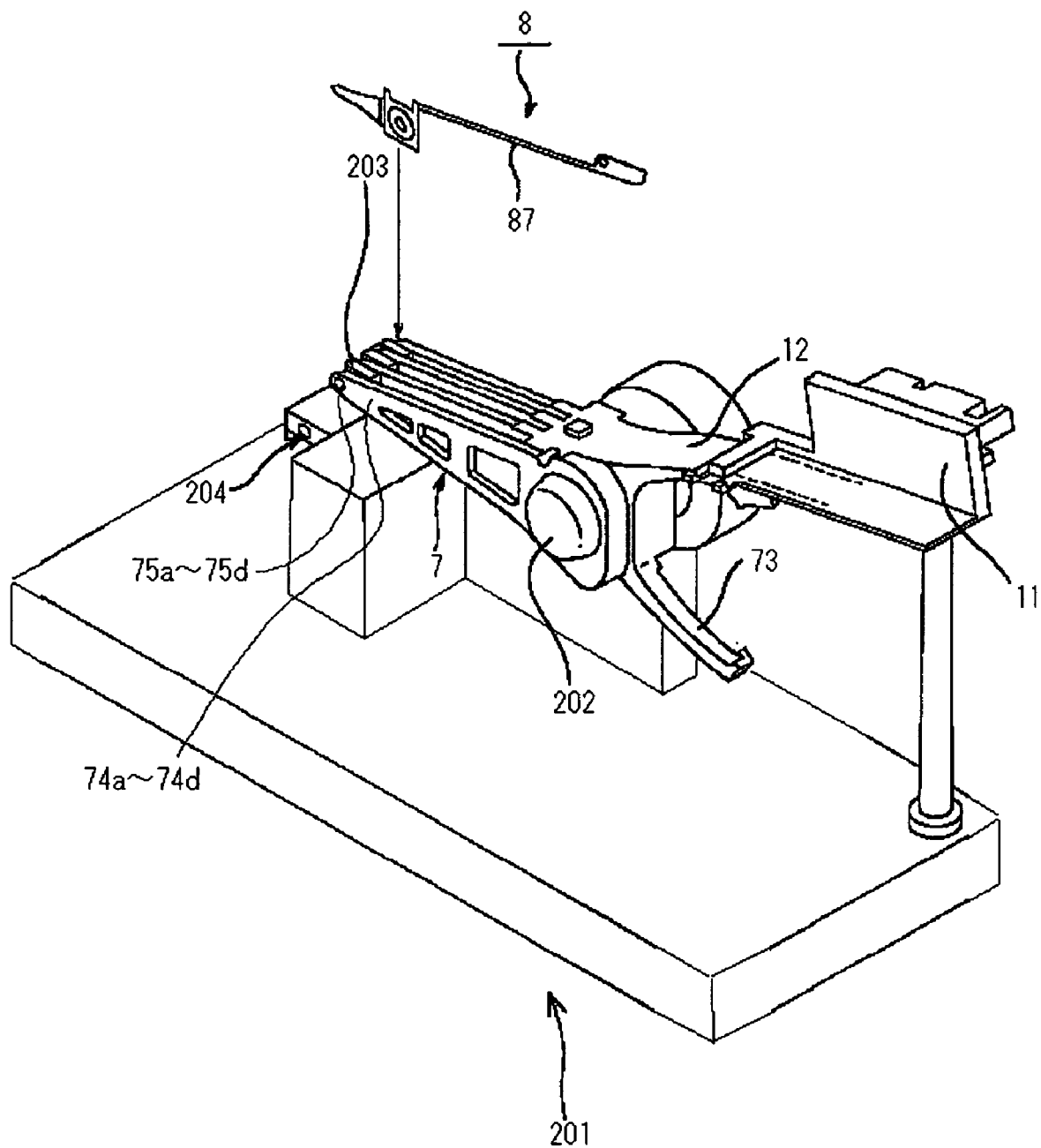
FIG. 5 is a view illustrating assembly procedures of the HSA using an assembly jig according to an embodiment of the present invention.
Figure 6:
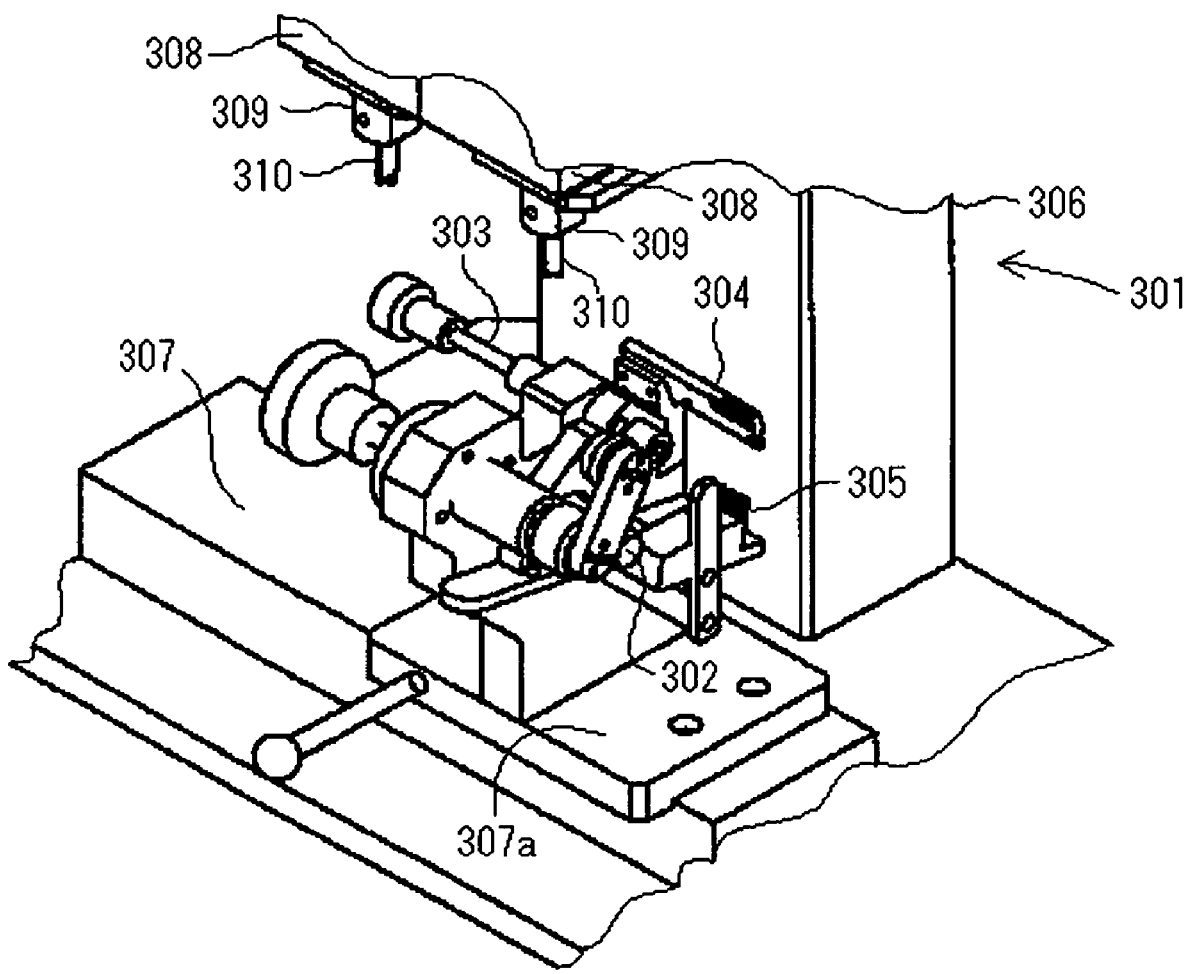
FIG. 6 is a perspective view showing a reworking jig for the HSA according to an embodiment of the present invention.
Figure 7:
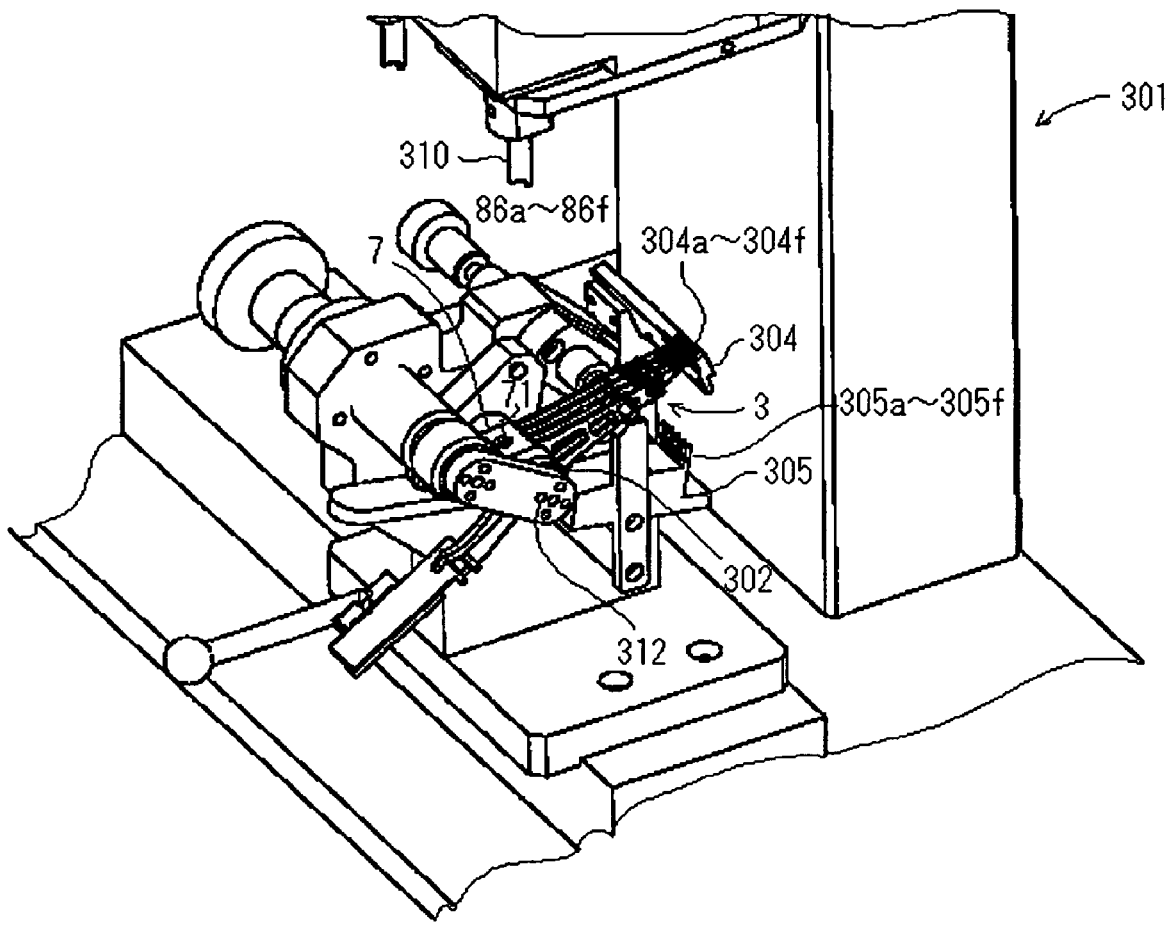
FIG. 7 is a view illustrating how to use the reworking jig shown in FIG. 6.
Figure 8:
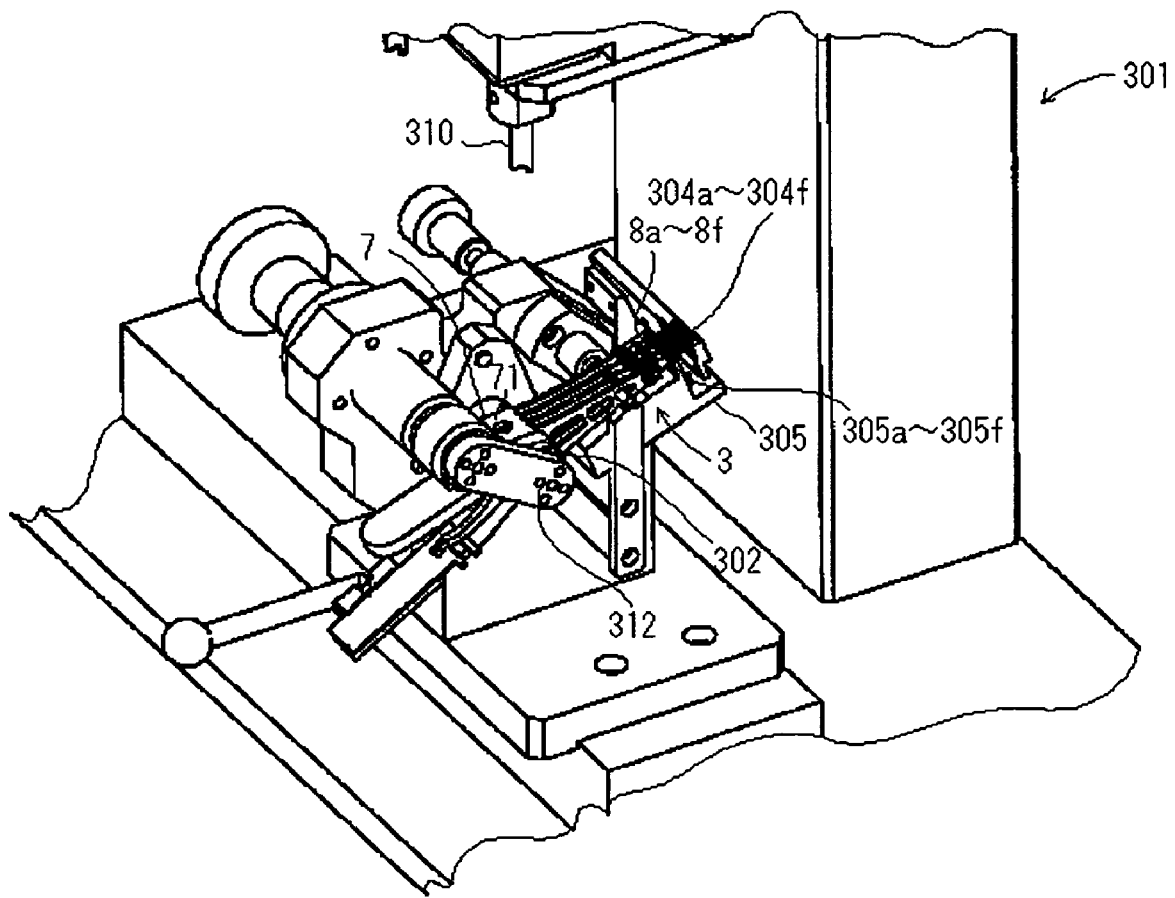
FIG. 8 is a view illustrating how to use the reworking jig shown in FIG. 6.

Manufacturing procedures for the HSA according to an embodiment of the present invention will be described with reference to FIGS. 4 through 11. In the following description, drawings other than FIGS. 4 through 11 will be referenced with the same reference numerals denoting the same parts. FIG. 4 is a flowchart illustrating the manufacturing processes of the HSA 3. FIG. 5 is a view illustrating assembly procedures of the HSA 3 using an assembly jig 201. FIG. 6 is a view showing a reworking jig 301 for rebuilding the HSA 3. FIG. 7 is a view illustrating a condition, in which the HSA 3 to be rebuilt is mounted on the reworking jig 301 and the merge lip of the HGA is pressed against a first vibration damping portion 304. FIG. 8 is a view illustrating a condition, in which the HGA is disposed in a slit in a second vibration damping portion 305 of the reworking jig 301. FIGS. 9A and 9B show a relation between a holder 309 and a cartridge type edge 310, FIG. 9A being a side cross-sectional view and FIG. 9B being a transverse cross-sectional view. FIG. 10 is a chart showing composition of SOLMIX. FIGS. 11A and 11B show an operating condition, in which a defective HGA is removed from the actuator arm using the cartridge type edge 310. FIG. 11A shows a condition, in which the cartridge type edge 310 lowers. FIG. 11B shows a condition, in which the cartridge type edge 310 advances into a gap between the mount plate and the actuator arm.

In block 101, the HGAs 8a to 8f are brought into an assembly site. The HGAs 8a to 8f are stored tidily in a transport tray (not shown). The carriage 7 is mounted on an assembly jig 201. The carriage 7 includes the coil support 73 and the actuator arms 74a to 74d. The carriage 7 is supported with a fixing shaft 202 that is inserted in a pivot opening 71a in the pivot bearing 71. Though omitted in FIG. 5, the voice coil 72 has been previously mounted in the coil support 73.

The carriage 7 is attached with the flexible printed wiring board 12. The flexible printed wiring board 12 is mounted with the external terminal 11. A wire support member not shown is provided on an upward facing end portion of the actuator arms 74a to 74d. The wire trace 87 is to be later secured to the wire support member after the HGAs 8a to 8f have been mounted to the actuator arms 74a to 74d.

When the carriage 7 as configured as described above is to be mounted on the assembly jig 201, it is ensured that the mount plates 84a to 84f of the HGAs 8a to 8f are aligned correctly with the swaging holes 75a to 75d in the actuator arms 74a to 74d. A total of six HGAs 8a to 8f are mounted to the carriage 7 as follows. Specifically, the HGA 8a and the HGA 8f are mounted to the actuator arm 74a and the actuator arm 74d, respectively. The HGAs 8b and 8c are mounted to the actuator arm 74b. The HGAs 8d and 8e are mounted to the actuator arm 74c. A spacer 203 is built into the assembly jig 201. The spacer 203 is designed to press the mount plate of the HGA mounted overlappingly with the actuator arm up against the surface of the actuator arm.

Before the HGAs 8a to 8f are mounted in the assembly jig 201, the spacer 203 is lowered. This allows the HGAs 8a to 8f to be mounted to the spacer between the actuator arms 74a to 74d. After the HGAs 8a to 8f have been mounted in the assembly jig 201, the spacer 203 is raised. This is done to press the HGAs 8a to 8f up against the actuator arms 74a to 74d such that the bosses 841 of the mount plates 84a to 84f fit into the swaging holes 75a to 75d in the actuator arms 74a to 74d.

The HGAs 8a to 8f are then secured to the actuator arms 74a to 74d. The mount plates 84a to 84f can be swaged and secured in the swaging holes 75a to 75d in the actuator arms 74a to 74d by the following procedure. Specifically, a metallic ball having a diameter slightly larger than through holes in the mount plates 84a to 84f is pushed in via a swaging ball loading port 204 in the assembly jig 201. When the assembly of the HSA 3 is completed, the HSA 3 is demounted from the assembly jig 201.

In block 102, an electrical test is conducted to determine whether or not the HSA 3 demounted from the assembly jig 201 operates properly. If a defective HGA is found in the test, a process is initiated, in which the defective HGA is removed and replaced with a good HGA.

In block 103, the HSA 3, in which a defective HGA was found, is mounted in the reworking jig 301 shown in FIG. 6. The reworking jig 301 includes a fixing shaft 302, an actuator arm support portion 303, a merge lip support portion 304, and an HGA support 305. The fixing shaft 302 supports the HSA 3 as the fixing shaft 302 is inserted into the pivot opening 71a in the pivot bearing 71 of the carriage 7. The actuator arm support portion 303 supports the actuator arms 74a to 74d of the carriage 7. The merge lip support portion 304 functions as the first vibration damping portion for pressing merge lips 86a to 86f of the HSA 3 supported on the fixing shaft 302 with the pressing load of the hinges of the HGAs 8a to 8f. The HGA support 305 functions as the second vibration damping portion for suppressing vibration of predetermined amplitude or more when the HGAs 8a to 8f are disposed therein. The fixing shaft 302, the actuator arm support portion 303, the merge lip support portion 304, and the HGA support 305 are provided on a reciprocating base 307a disposed reciprocatingly on a table 307 formed on a lower portion of a frame 306. In FIG. 6, the reciprocating base 307a is disposed longitudinally reciprocatingly on the table 307. In addition, the reworking jig 301 may include the same mechanism for the swaging operation performed for the HGA mounted on the actuator arm as that used with the assembly jig 201.

The HSA 3 is mounted on the reworking jig 301 as configured as described in the foregoing as follows. Specifically, referring to FIG. 7, the pivot opening 71a (see FIG. 2) of the pivot bearing 71 of the carriage 7 is fitted over the fixing shaft 302. Then, using a stopper mechanism 312, the HSA 3 is prevented from coming off the fixing shaft 302. In block 103a, the merge lips 86a to 86f included in the HGAs 8a to 8f of the HSA 3 are inserted into slits 304a to 304f in the merge lip support portion 304. When the merge lips 86a to 86f are inserted in the slits 304a to 304f, the merge lips 86a to 86f are pressed against the slits 304a to 304f in the merge lip support portion 304 with the pressing load of the HGAs 8a to 8f. When the merge lips 86a to 86f of the HGAs 8a to 8f are pressed against the slits 304a to 304f in the merge lip support portion 304, it becomes possible to suppress to some extent vibration that occurs during removal of the defective HGA from the HSA 3. In block 103b, referring to FIG. 8, the HGAs 8a to 8f of the HSA 3 are disposed in slits 305a to 305f in the HGA support 305. A vibration amplitude of other HGAs that occurs during the removal of the defective HGA from the HSA 3 is thereby limited. When all these steps are completed, the HSA 3 is mounted in the reworking jig 301.

Referring to FIG. 6, the reworking jig 301 includes a reworking tool 308. The reworking tool 308 is provided at an upper portion of the frame 306. The reworking tool 308 is used for removing the defective HGA from the HSA 3 mounted in the reworking jig 301. The shearing edge of the cartridge type edge 310 mounted in the holder 309 serving as a support for the reworking tool 308 is disposed so as to face the table 307. The reworking tool 308 includes an existing elevator mechanism (not shown). The elevator mechanism allows the holder 309 to be lowered toward the table 307 and raised away therefrom. Looking the reworking jig 301 from an operating side, the position of the holder 309 can be adjusted in a longitudinal direction and a crosswise direction. The position adjustment may be made manually or automatically. An existing position adjustment mechanism can be used for the purpose. In FIG. 6, two reworking tools 308 are installed, one on the right-hand side and the other on the left-hand side of the frame 306.

Referring to FIGS. 9A and 9B, the holder 309 of the reworking tool 308 includes a main body 309a and a shank 309b. The main body 309a includes an opening 309a' for mounting therein a shank 310a of the cartridge type edge 310. The main body 309a of the holder 309 includes a clamping mechanism (not shown) for securing in position the shank 310a of the cartridge type edge 310. The reworking tool 308 also includes a clamping mechanism (not shown) for securing the shank 309b of the holder 309. Any existing mechanism may be used for these clamping mechanisms. The shearing edge of the cartridge type edge 310 is formed into a shape effective for easily separating the actuator arm from the mount plate of the HGA, the two being in tight contact with each other. This will be described later. Specifically, the shearing edge of the cartridge type edge 310 is wedge-shaped (as shown in FIGS. 11A and 11B). An inclined surface of the wedge-shaped shearing edge is oriented toward the HGA. When the shearing edge of the cartridge type edge 310 is inserted into the gap between the actuator arm and the mount plate of the HGA, the base plate of the mount plate is lifted off along the inclined surface of the shearing edge.

The main body 309a of the holder 309 includes a feed hole 309c and a feed groove 309d. The feed hole 309c penetrates from an outside through the opening 309a'. The feed groove 309d is formed in a surface of the opening 309a' and communicates with the feed hole 309c. A feed pipe 401 for feeding an alcohol solvent from the outside is connected to the feed hole 309c. The feed pipe 401 is connected to an alcohol solvent feeding apparatus (not shown) capable of feeding a predetermined amount of alcohol solvent. The feed groove 309d is cut straight downward in FIG. 9A from the position of the feed hole 309c. When the holder 309 is mounted in the reworking tool 308 and the predetermined amount of alcohol solvent is fed from the alcohol solvent feeding apparatus, the alcohol solvent flows through the feed pipe 401 to the feed hole 309c. Then, the straight downwardly cut feed groove 309d allows the alcohol solvent, which has flowed to the feed hole 309c, to flow further to the cartridge type edge 310 along the feed groove 309d by gravity. The shearing edge of the cartridge type edge 310 is formed into a shape that allows the alcohol solvent to take the shape of a drop through surface tension.

The alcohol solvent evaporates to disappear after the lapse of a predetermined period of time. This means that the alcohol solvent provides no hindrance to subsequent operations. Preferably, the alcohol solvent should not corrode metallic portions and should be harmless to the human body. A mixed solvent having ethanol as a main component may be selected as the alcohol solvent meeting the aforementioned requirements. Such a mixed solvent is available as SOLMIX (a registered trademark of Japan Alcohol Trading Co., Ltd.) from Japan Alcohol Trading Co., Ltd. FIG. 10 is a composition table showing components of some products under SOL-MIX. A-7 to HP-7 are product names. SOLMIX contains ethanol as the main component, and methanol, isopropyl alcohol (IPA), normal propyl alcohol (NPA), water, and the like.

Further, the alcohol solvent is not limited to the mixed solvent cited above. Rather, the alcohol solvent may be a solvent of any one of the following: methanol, ethanol, isopropyl alcohol, normal propyl alcohol, methyl ethyl ketone (MEK), methyl isobutyl ketone (MIBK), and the like. Or, the alcohol solvent may even be a mixed solvent of any two or more of these substances.

In block 104, the position of the shearing edge of the cartridge type edge 310 is set. First of all, the reciprocating base 307a is moved to, and fixed at, for example, a point under the right reworking tool 308 shown in FIG. 6. Then, the position adjustment mechanism for the reworking tool 308 is used to adjust positions so that the shearing edge of the cartridge type edge 310 is located at a point, at which the defective HGA of the HSA 3 mounted in the reworking jig 301 can be separated from the actuator arm, to which the defective HGA is secured. After this position adjustment has been completed, in block 105, the predetermined amount of the alcohol solvent is supplied to the feed pipe 401 using the alcohol solvent feeding apparatus. The alcohol solvent fed to the feed pipe 401 flows into the feed hole 309c. The alcohol solvent that has flowed to the feed hole 309c is moved through gravity to the shearing edge of the cartridge type edge 310 along the feed groove 309d. The alcohol solvent is then deposited on the shearing edge of the cartridge type edge 310 in a drop-like shape through surface tension. The amount of the alcohol solvent fed should preferably be such that the shearing edge of the cartridge type edge 310 is wet just enough to allow the alcohol solvent to function as a lubricant instantaneously when the defective HGA of the HSA 3 is separated from the actuator arm, to which the defective HGA is secured. The specific instant, at which the defective HGA of the HSA 3 is separated from the actuator arm, to which the defective HGA is secured, will be described later.

In block 106, the defective HGA is removed. The holder 309 is moved downward using the elevator mechanism for the reworking tool 308 that has previously been positioned in block 104. Referring to FIGS. 11A and 11B, as the holder 309 moves downward, the shearing edge of the cartridge type edge 310 slides over the surface of the actuator arm 74. In block 106a, the shearing edge is then inserted in a gap between the contacting surfaces of the base plate 842 of the mount plate 84 and the actuator arm 74. An inclined surface 74' should preferably be provided at a position, at which the shearing edge of the cartridge type edge 310 gains a ground for advancing. The inclined surface 74' is adjacent to the surface of the actuator arm 74 in contact with the base plate 842 of the mount plate 84. The reason for the inclined surface 74' provided in the actuator arm 74 is as follows. Specifically, the shearing edge of the cartridge type edge 310 should preferably be arranged to be deviated toward a rear end from the surface of the actuator arm 74 in order to ensure that the shearing edge is positively pressed against the surface of the actuator arm 74 during insertion. This arrangement allows the shearing edge of the cartridge type edge 310 to be positively pressed against the surface of the actuator arm 74 by letting the shearing edge slide over the inclined surface 74'. This results in the shearing edge of the cartridge type edge 310 being properly inserted into the gap between the contacting surfaces of the base plate 842 of the mount plate 84 and the actuator arm 74.

The drop-like alcohol solvent deposited through surface tension on the shearing edge of the cartridge type edge 310 functions as a lubricant when the shearing edge is inserted into the gap between the contacting surfaces of the base plate 842 of the mount plate 84 and the actuator arm 74. This produces no friction at the shearing edge, thus preventing any vibration from occurring. This in turn prevents vibration from being transmitted to other HGAs through the carriage. Any good HGAs can therefore be prevented from being damaged. It can also be prevented that the mount plate 84 is left on the actuator arm 74.

The defective HGA has now been removed from the actuator arm of the carriage without allowing any good HGAs to be damaged as described in the foregoing. Then, the HSA is demounted from the reworking jig 301. In block 107, a good HGA is mounted on the actuator arm. The same procedure as in block 101 is performed for this installation procedure. Specifically, the good HGA is mounted in the assembly jig 201. The good HGA is then secured through the swaging operation to the actuator arm, from which the defective HGA has been removed. In block 108, the assembly of the HSA 3 is completed. When the assembly of the HSA 3 is completed, the HSA 3 is demounted from the assembly jig 201 to complete the entire manufacturing processes.

The entire manufacturing processes covering from block 101 through block 108 must be carried out in a clean room. Use of the alcohol solvent as the lubricant is therefore advantageous. The reason for performance of the entire manufacturing processes in the clean room is as follows. Specifically, if the processes are carried out in a site other than the clean room, the HSA is contaminated with dust and dirt, requiring a second cleaning process.

A comparative test was conducted of such manufacturing processes as described in the foregoing between when the alcohol solvent was used as the lubricant and when the lubricant was not used. When the lubricant of the alcohol solvent was used, of the total 18 HSAs, none had good HGAs being damaged, deformed, or otherwise marred (hereinafter simply "damaged"). Further, the ratio of HSAs, in which the mount plate was left on the actuator arm, was 0%. When the lubricant was not used, on the other hand, of the total ten HSAs, none had a damaged HGA. This means that there is no difference between the two cases, one using the lubricant and one not using the lubricant. The ratio of HSAs, in which the mount plate was left on the actuator arm, was 90%. There is therefore a marked difference between the two cases in terms of the ratio of HSAs, in which the mount plate was left on the actuator arm. It has therefore been confirmed that the use of the alcohol solvent as the lubricant prevents the mount plate from being left on the actuator arm.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method for rebuilding a head stack assembly, the head stack assembly including a carriage having a plurality of actuator arms and a plurality of head gimbal assemblies, to each head gimbal assembly a base plate of a mount plate is fixed, and in each of which a boss of each mount plate is swaged into one of the plurality of actuator arms, the method comprising:

mounting the head stack assembly in a jig;
    facing a shearing edge of a reworking tool to contacting surfaces of the base plate and a first actuator arm;
    depositing a volatile alcohol solvent on the shearing edge of the reworking tool;
    letting the shearing edge of the reworking tool slide on a surface of the actuator arm to insert the shearing edge of the reworking tool in the contacting surfaces of the base plate and the first actuator arm and thereby removing the mount plate together with a first head gimbal assembly from the first actuator arm; and
    securing another head gimbal assembly to the first actuator arm, from which the first head gimbal assembly has been removed, through a swaging operation.

2. The method for rebuilding a head stack assembly according to claim 1,
    wherein the mounting, facing, depositing, letting, and securing are carried out in a clean room.

3. The method for rebuilding a head stack assembly according to claim 1,
    wherein each of the plurality of head gimbal assemblies includes a merge lip at a leading end thereof; and
    wherein mounting the head stack assembly in the jig includes pressing the merge lip up against a first vibration damping portion of the jig with a pressing load of the first head gimbal assembly.

4. The method for rebuilding a head stack assembly according to claim 1,
    wherein mounting the head stack assembly in the jig includes disposing each of the plurality of head gimbal assemblies in a slit in a second vibration damping portion of the jig, thereby limiting a vibration amplitude.

5. The method for rebuilding a head stack assembly according to claim 1,
    wherein each of the plurality of actuator arms includes an inclined surface adjacent to the surface thereof in contact with the base plate at a position, at which the
    shearing edge of the reworking tool gains ground for advancing; and
    wherein removing the mount plate from the first actuator arm includes letting the shearing edge of the reworking tool slide over the inclined surface.

6. The method for rebuilding a head stack assembly according to claim 1,
    wherein depositing the volatile alcohol solvent on the shearing edge of the reworking tool includes feeding the alcohol solvent using a holder of the reworking tool, the holder including an opening, in which a cartridge type edge included in the reworking tool is inserted, a feed hole penetrating from an outside through the opening, and a feed groove formed in a surface of the opening and communicating with the feed hole; and wherein the alcohol solvent being fed through the feed hole.

7. The method for rebuilding a head stack assembly according to claim 1,
    wherein the alcohol solvent includes a mixed solvent having ethanol as a main component.

8. The method for rebuilding a head stack assembly according to claim 7,
    wherein the mixed solvent includes methanol.

9. The method for rebuilding a head stack assembly according to claim 7,
    wherein the mixed solvent includes isopropyl alcohol.

10. The method for rebuilding a head stack assembly according to claim 7,
    wherein the mixed solvent includes normal propyl alcohol.

11. The method for rebuilding a head stack assembly according to claim 1,
    wherein the alcohol solvent includes a mixed solvent including one or any two or more elements selected from the group consisting of methanol, ethanol, isopropyl alcohol, normal propyl alcohol, methyl ethyl ketone, and methyl isobutyl ketone.

12. The method for rebuilding a head stack assembly according to claim 1,
wherein two head gimbal assemblies are secured through a swaging operation to each of the actuator arms sandwiched between an uppermost and a lowermost surface of each of the actuator arms.

13. The method for rebuilding a head stack assembly according to claim 1, further including moving the alcohol solvent from a holding portion to the shearing edge of the reworking tool by gravity and depositing the alcohol solvent on the shearing edge in a drop-like shape through surface tension.

\* \* \* \* \*